(12) United States Patent
Pratt et al.

(10) Patent No.: US 11,026,369 B2
(45) Date of Patent: Jun. 8, 2021

(54) MULTIPURPOSE LEAF CROP HARVESTING APPARATUS AND PROCESSING METHOD

(71) Applicant: GREEN GOLD DEVELOPMENT, LLC, Aberdeen, ID (US)

(72) Inventors: Christopher A. Pratt, Aberdeen, ID (US); A. Scott Jackson, Jerome, ID (US)

(73) Assignee: GREEN GOLD DEVELOPMENT, LLC, Aberdeen, ID (US)

( * ) Notice: Subject to any disclaimer, the term of this patent is extended or adjusted under 35 U.S.C. 154(b) by 279 days.

(21) Appl. No.: 15/881,286

(22) Filed: Jan. 26, 2018

(65) Prior Publication Data

US 2018/0213722 A1 Aug. 2, 2018

Related U.S. Application Data

(60) Provisional application No. 62/451,680, filed on Jan. 28, 2017.

(51) Int. Cl.
 *A01D 45/00* (2018.01)
 *A01D 91/04* (2006.01)
 (Continued)

(52) U.S. Cl.
 CPC ........... *A01D 45/00* (2013.01); *A01D 43/063* (2013.01); *A01D 43/10* (2013.01); *A01D 45/30* (2013.01);
 (Continued)

(58) Field of Classification Search
 CPC ........ A01D 45/00; A01D 45/30; A01D 45/04; A01D 45/06; A01D 45/065; A01D 43/063;
 (Continued)

(56) References Cited

U.S. PATENT DOCUMENTS 3,889,884 A 6/1975 Morse
3,977,165 A * 8/1976 Klinner ................. A01D 43/08
 56/16.4 R
(Continued)

FOREIGN PATENT DOCUMENTS

WO PCT/1984/00660 A 11/1985

OTHER PUBLICATIONS

Agricultursal Engineering International, Customized and Value-added High Quality Alfalfa Products: A New Concept, Jun. 2007, CIGR Ejournal. Manuscript FP 07 003. vol. IX.*

(Continued)

*Primary Examiner* — Adam J Behrens
(74) *Attorney, Agent, or Firm* — Richard D. Clarke

(57) ABSTRACT

The Multipurpose Leaf Crop Harvesting Apparatus and Processing Method will accomplish seven steps in one pass of the combine harvester. This apparatus and processing method harvests leaf crops and is configured to perform multiple processing operations, including fractionation of the leaf crop, leaf maceration, leaf sizing, elevating the leaf fraction to a transport vehicle, and stem conditioning, cutting and windrowing, in a single pass through the crop field. These steps are accomplished using a header unit, an adapter feeder macerator and a forage harvester vehicle, expeditiously removing the leaf fraction from the field. Following leaf fraction harvesting, the leaf fraction is processed by densification into forage feed products. The processed leaf fraction can be combined with other feeds to make up customized feed rations. The stem fraction is also processed. The present invention can also be used to harvest grass crops.

9 Claims, 8 Drawing Sheets

(51) Int. Cl.
*A01D 45/30* (2006.01)
*A01D 43/10* (2006.01)
*A01D 43/063* (2006.01)
*A01D 34/14* (2006.01)
*A01D 34/835* (2006.01)
*A01D 34/04* (2006.01)
*A01D 41/12* (2006.01)

(52) U.S. Cl.
CPC .............. *A01D 91/04* (2013.01); *A01D 34/04* (2013.01); *A01D 34/14* (2013.01); *A01D 34/8355* (2013.01); *A01D 41/1243* (2013.01)

(58) Field of Classification Search
CPC ................ A01D 43/10; A01D 43/0635; A01D 41/1243; A01D 91/04; A01D 34/04; A01D 34/01; A01D 34/8355
See application file for complete search history.

(56) References Cited

U.S. PATENT DOCUMENTS

| | | | |
|---|---|---|---|
| 4,207,811 A | 6/1980 | Kline | |
| 4,325,209 A | 4/1982 | Cicci | |
| 4,629,122 A | 12/1986 | Fardal et al. | |
| 4,747,260 A * | 5/1988 | Petrasch | A01F 29/10 241/101.742 |
| 5,419,107 A | 5/1995 | Shelbourne et al. | |
| 5,894,716 A | 4/1999 | Haldeman et al. | |
| 6,453,654 B1 * | 9/2002 | Kraus | A01D 43/10 56/16.4 C |
| 6,604,352 B1 * | 8/2003 | Tyvaert | A01D 43/086 56/16.4 B |
| 8,353,149 B2 * | 1/2013 | Engel | A01D 43/107 56/16.4 A |
| 8,701,376 B2 * | 4/2014 | Laumeier | A01D 82/00 56/16.4 A |
| 9,220,197 B2 * | 12/2015 | Pollklas | A01D 45/00 |
| 9,706,712 B2 * | 7/2017 | Look | A01D 61/00 |
| 2005/0126150 A1 * | 6/2005 | Talbott | A01D 45/00 56/103 |
| 2009/0017885 A1 * | 1/2009 | Halls | A01F 12/18 460/20 |
| 2009/0165429 A1 * | 7/2009 | Telleen | A01F 25/14 53/564 |
| 2012/0102905 A1 * | 5/2012 | Dold | A01D 41/142 56/12.7 |
| 2013/0047504 A1 * | 2/2013 | Gauthier | A01K 1/0154 47/58.1 SC |
| 2013/0219847 A1 * | 8/2013 | Miller | A01D 41/16 56/156 |
| 2014/0157743 A1 * | 6/2014 | Isfort | A01D 61/00 56/10.1 |
| 2016/0081276 A1 * | 3/2016 | Riesterer | A01F 15/08 700/275 |

OTHER PUBLICATIONS

Shinners, K. J., Harvest Fractionation of Alfalfa, American Society of Agricultural and Biological Engineers, Transactions of the ASABE vol. 50(3): 713-718 2007.
Shinners Kevin J., Innovative Methods to Preserve Alfalfa Quality, Proceedings: Calfornia Alfalfa and Forage Symposium, Reno, NV, Nov. 29-Dec. 1, 2016. UC Cooperative Extension, Plant Sciences Dept. Univ. of California, Davis, CA 95616 (also see http://alfalfa.ucdavis.edu for this and other alfalfa conference proceedings).
Hatfield, Ronald, US Dairy Forage Research Center, Harvesting Alfalfa Leaves Separately from Stems, USDA-ARS Publication.
PCT Search Report/Written Opinion of the International Search Authority, dated Mar. 29, 2018 re: PCT/US2018/015501, Applicant Green Gold Development, LLC, 8 pages.

* cited by examiner

Processing Steps Taken Expeditiously After Harvesting

Examples of Crops Harvested by the Multipurpose Harvesting Apparatus and Process Techniques Dry matter losses during harvest and storage relative to moisture content at harvest Forage yield relative to quality at different stages

MULTIPURPOSE LEAF CROP HARVESTING APPARATUS AND PROCESSING METHOD

FIELD OF THE INVENTION

This application describes an multipurpose leaf crop harvesting apparatus and processing method that harvests leaf crops and grasses and is capable of performing seven different processes including in-field fractionation of leaf crop leaves and stems, leaf maceration of the leaf fraction, leaf forage sizing, elevating the leaf fraction to a transport vehicle or trailer, as well as cutting the stem fraction, conditioning the stem fraction and windrowing the stem fraction for later baling, all in a single pass through the crop field.

BACKGROUND OF THE INVENTION

The present problem is the inconsistent quality of product, inclement weather, and leaf loss at harvest. Animals produce better yields and are healthier when given consistent proper nutrition. Leaves in alfalfa, whether they are harvested early or late in the growth cycle of the plant, make up a primary component of a resulting feed ration derived from harvested alfalfa. Using the Multipurpose Leaf Crop Harvesting Apparatus and Processing Method, the leaf fraction of the plant can be harvested for optimal leaf yield. The conventional methods for producing quality alfalfa are responsible for losing about 24% of the high-quality leaf yield potential due to harvest intervals, poor weather, and mechanical losses.

The Multipurpose Leaf Crop Harvesting Apparatus and Processing Method eliminates all but 3-5% of leaf loss, increases nutritional values by retaining water soluble nutrition by quickly drying leaf fraction, and eliminating harvest weather risks to the leaf fraction. The conventional method for producing dried alfalfa has not changed since the 1950's. Alfalfa is cut, conditioned, windrowed, raked, baled, and stacked. The sizes of both the machinery and the bales have gotten bigger and faster over time but the basic process has remained the same. Conventional haying faces the following problems: mechanical yield loss at each step of the process, yield and quality losses due to the harvest weather risks of rain, hail, humidity, wind, too much dew, not enough dew and sun bleach producing an inconsistency of product due to the maturation and ever-changing feed quality of the stem fraction.

A Comparison of "Alfalfa Leaf Hay" and Conventionally Baled Hay in today's market:

Conventional Hay (6 baled tons harvested product per acre)
$120 average price per ton in 2015 in Southeastern Idaho (dairy quality hay $180, export $120, feeder $75),
$720 per acre gross return (this return is, in many cases, at or below the cost of production)
Alfalfa Leaf Hay
7.4 total tons of alfalfa per acre (the harvesting process gains 15% total tonnage to the leaf fraction, and harvest timing will add 8% to the harvested total):
3.92 tons of leaf hay at $330.00=$1,293.60,
3.25 tons of stem hay at $65.00=$226.20
$1,293.60+$226.20=$1,519,80 gross per acre
$1,519,80 per acre gross return
Alfalfa Leaf Hay Production Costs
$42.19 per ton fuel for drying the alfalfa leaf fraction based on $94.80 cost to dry the whole alfalfa plant with a leaf to stem drying of ratio of 3:1
$6.00 per ton electricity for the drying
$16.50 per ton transportation leaf fraction from field to dryer (50-mile average distance)
$3.09 per ton leaf harvester
$21.00 per ton dryer capital cost
$14.00 packaging cost
$102.78 total harvest cost per ton leaf fraction
$3.09 per ton stem cutting
$3.04 per ton rake stem fraction
$14.00 per ton bale stem fraction
$4.00 per ton stack stem fraction
$24.13 per ton total harvest cost
$402.90 leaf fraction harvest per acre ($102.78*192 tons/acre)
$83.97 stem fraction harvest cost per acre (24.13*3.48 tons/per acre)
$585.00 per acre paid to farmer (based on a standard 65%-35% custom rate @ $150 per ton)
$83.65 per acre based on 7.5% fudge factor
$1158.52 cost of production
$1,519.80-1,158.52=$361.28 net return per acre or a 23.7% margin.

What is Alfalfa Leaf Hay? The Alfalfa Leaf Hay process fractionates the alfalfa plant. The leaf fraction is separated from the stem fraction of the alfalfa plant at harvest. The high value, high quality leaf fraction is taken directly from the field to be cured in a dryer and the stem fraction is left in the field to be sun cured. This eliminates leaf fraction harvest weather risk and increases the yield of the harvested leaves by about 24% through reduced harvest leaf loss and the ability to time the harvest for maximum leaf fraction yield. The leaf and stem products can then be used to provide the customer with the exact alfalfa nutrition required for their animals.

Numerous innovations for the harvesting alfalfa have been provided in the prior art that are described as follows. Even though these innovations may be suitable for the specific individual purposes to which they address, they differ from the present design as hereinafter contrasted. The following is a summary of those prior art patents most relevant to this application at hand, as well as a description outlining the difference between the features of the Multipurpose Leaf Crop Harvesting Apparatus and Processing Method.

U.S. Pat. No. 4,678,129 of James F Dallenger describes a crop processor for forage harvesters that includes a paddle wheel assembly for replacing the lower compressor roll of a compressor roll assembly. The paddle wheel assembly includes paddles arranged to convey crop material that has been previously cut and chopped by a cutter head toward a discharge blower while causing only minimal further conditioning of the cut and chopped crop material. When harvesting grass crops such as alfalfa, the paddle wheel assembly prevents plugging of the crop processor.

This patent describes a modification to a crop processor for forage harvesters that includes a paddle wheel assembly but does not describe the unique features of the Multipurpose Leaf Crop Harvesting Apparatus and Processing Method capable of performing multiple steps in one pass of the harvester, to directly remove the crop from the field and reduce the risk of damage to the crops by moisture when it is left in the field to dry before processing.

U.S. Pat. No. 5,884,225 of Michael S. Allen et al, describes a system and a method for providing farmers/producers with crop characteristic predictions for standing crops located in fields includes a central database for storing field and crop information for the crops. A weather data processor receives raw weather data from either or both of (1) a weather data service with collected weather data from a plurality of weather stations; and (2) one or more site specific weather stations associated with a particular field whose information is in the database. The raw weather data are processed to obtain field weather parameters for entry into a crop characteristic prediction equation, and the parameters are stored in the central database. With a user interface, a crop whose information is stored in the central database is selected. A computer calculates a crop characteristic prediction for the selected field based on the crop and field information stored in the central database, including the field weather parameters in the database, and the crop characteristic prediction formula. The producer uses the prediction to determine time of harvest. In one embodiment, the crops are alfalfa crops and the crop characteristic is neutral detergent fiber content.

This patent describes a system and a method for providing farmers/producers with crop characteristic predictions for standing crops regarding the possibility of crop damage to the crops harvested and left on the field when inclement weather changes create rain or hail which can damage the crops. By harvesting using the Multipurpose Leaf Crop Harvesting Apparatus and Processing Method capable of performing multiple steps in one pass of the harvester to directly remove the crop from the field, the risk of damage to the crops by moisture when it is left in the field to dry before processing, are significantly reduced.

U.S. Pat. No. 9,439,385 of David C. Johnson describes an invention that relates to the field of alfalfa plants, and more specifically to alfalfa germplasm and alfalfa varieties having improved standability and/or fast recovery after spring green-up or fast recovery after harvest and methods for producing such improved germplasm and varieties.

This patent describes an invention that relates to the field of alfalfa plants, and more specifically to alfalfa germplasm but does not teach or disclose the unique features of the Multipurpose Leaf Crop Harvesting Apparatus and Processing Method with the capability of performing multiple steps in one pass of the alfalfa combine harvester, to reduce the risk of damage to the crops by moisture when it is left in the field to dry before processing.

U.S. Pat. No. 4,109,448 of Donald C. Kline describes an apparatus carried on a self-propelled vehicle field processes alfalfa to obtain therefrom fiber and protein components and a deproteinized liquid component which is simultaneously applied on the field as the vehicle advances. The apparatus includes a harvesting head assembly which is mounted on the front of the vehicle to cut the alfalfa and means to convey the alfalfa rearwardly to a macerator which shreds the harvested alfalfa. The macerated alfalfa is separated into fibrous and liquid fractions by a dewatering press which is connected to the macerator by a conveyor. The fibrous fraction is blown rearwardly into a trailer pulled behind the vehicle. The liquid fraction is heated to a predetermined temperature and is pumped into a holding tank wherein the protein in the liquid coagulates and floats on the deproteinized liquid. The protein is skimmed from the deproteinized liquid and is collected in a storage container mounted on the vehicle. The deproteinized liquid is applied on the ground beneath the vehicle by a sprayer assembly. A method for in-field processing of alfalfa is disclosed.

This patent describes an apparatus carried on a self-propelled vehicle field processes alfalfa to obtain therefrom fiber and protein components and a deproteinized liquid component which is simultaneously applied on the field as the vehicle advances. This process does not teach or disclose the unique features of the Multipurpose Leaf Crop Harvesting Apparatus and Processing Method with the capability of performing multiple steps in one pass of the alfalfa combine harvester, to reduce the risk of damage to the crops by moisture when is left in the field to dry before processing.

U.S. Pat. No. 4,185,786 of Donald C. Kline describes an apparatus carried on a self-propelled vehicle field processes alfalfa to obtain therefrom fiber and protein components and a deproteinized liquid component which is simultaneously applied on the field as the vehicle advances. A specially-designed macerator for shredding the harvested alfalfa is disclosed. The macerator includes a cylindrical die ring having an open end and a series of peripheral apertures through which the alfalfa is extruded by means of a pair of rollers mounted inside the die ring for rotation therewith. The die ring is rotatably supported in a frame, and the rollers are coupled to the die ring for rotation in synchronism. A shroud surrounds the periphery of the die ring to collect macerated alfalfa, and an impeller is mounted inside the shroud for displacing macerated alfalfa downwardly through an outlet in the bottom of the shroud.

This process again does not teach or disclose the unique features of the Multipurpose Leaf Crop Harvesting Apparatus and Processing Method with the capability of performing multiple steps in one pass of the alfalfa combine harvester, to reduce the risk of damage to the crops by moisture, when it is left in the field to dry before processing.

US Patent Application Publication No US2014/0081587 A1 of Jeffery S. Roberts describes a method where the weight of the bale is measured by a scale on the baler, the moisture of the bale is measured by sensors on the baler and this information is sent to a processor. Based on compaction properties of the leaf verses the stem of the alfalfa, the processor calculates a feeding value for the hay including protein, energy and relative feed value on the dry density of the bale. Additional inputs such as the compaction setting of the baler and information about the hay being harvested can also be input into the processor for making adjustment to the feeding value calculation.

This patent describes a method where the weight of the bale is measured by a scale on the baler but does not teach or disclose the unique features of the Multipurpose Leaf Crop Harvesting Apparatus and Processing Method with the capability of performing multiple steps in one pass of the alfalfa combine harvester, to reduce the risk of damage to the crops by moisture when it is left in the field to dry before processing.

U.S. Pat. No. 4,297,091 of Michael R. Strefling describes an alfalfa pelletizing apparatus and method wherein pellets are formed in an open-ended molding passage or aperture by compressing members entering both ends of the aperture to compress the alfalfa and to extract liquid content for discharge at a passage communicating with the mid portion of the primary mold aperture. The mold apertures are formed in, a moving belt upon which the alfalfa is discharged. The pellets are expelled from the apertures after formation thereof and the forming apertures are then cleaned after release of the pellets.

This patent describes an alfalfa pelletizing apparatus and method wherein pellets are formed but does not teach or disclose the unique features of the Multipurpose Leaf Crop Harvesting Apparatus and Processing Method with the capability of performing multiple steps in one pass of the alfalfa combine harvester, to reduce the risk of damage to the'crops by moisture when it is left in the field to dry before processing.

U.S. Pat. No. 6,359,199 of Paul L. F. Sun, Roscoe describes an alfalfa product, hybrids and non-hybrids, and a method for synthesizing an alfalfa product having increased uniformity for preselected traits having improved uniformity of one or more selected traits, including flowering dates, flower frequency, maturity rate, growth rate, fall dormancy and winter hardiness. The alfalfa product may also include improved predictability of these traits. A scheduled harvest system may be established using two or more varieties of the alfalfa product having different and predictable mean flowering dates. The scheduled harvest system may be designed to allow for harvesting of alfalfa varieties at maximum relative feeding value. The method may be used to synthesize an alfalfa product having one or more predetermined traits. The method selects germplasm, including a cytoplasmic male sterile line, a genetic male sterile line, a maintainer line, a restorer line and a line having normal cytoplasm, having ergonomically desirable traits. Plants grown from the germplasm are classified and grouped for predetermined traits at different stages of testing and seed increase. The method selects genetically desirable plants having the predetermined traits for seed increase.

This patent describes a method for synthesizing an alfalfa product having increased uniformity for preselected traits having improved uniformity of one or more selected traits, including flowering dates, flower frequency, maturity rate, growth rate, fall dormancy and winter hardiness. This patent does not teach or disclose the unique features of the Multipurpose Leaf Crop Harvesting Apparatus and Processing Method with the seven steps in one pass of the alfalfa combine harvester to reduce the risk of damage to the crops by moisture when it is left in the field to dry before processing.

None of these previous efforts, however, provides the benefits attendant with the Multipurpose Leaf Crop Harvesting Apparatus and Processing Method. The present design achieves its intended purposes, objects and advantages over the prior art devices through a new, useful and unobvious combination of method steps and component elements by employing readily available equipment and materials.

In this respect, before explaining at least one embodiment of this application in detail it is to be understood that the process is not limited in its application to the details of construction and to the arrangement of the components set forth in the following description or illustrated in the drawings the Multipurpose Leaf Crop Harvesting Apparatus and Processing Method is capable of other embodiments and of being practiced and carried out in various ways. In addition, it is to be understood that the phraseology and terminology employed herein are for the purpose of description and should not be regarded as limiting. As such, those skilled in the art will appreciate that the conception, upon which this disclosure is based, may readily be utilized as a basis for designing of other applications and systems for carrying out the several purposes of the present design. It is important, therefore, that the claims be regarded as including such equivalent processes insofar as they do not depart from the spirit and scope of the present application.

SUMMARY OF THE INVENTION

The principal advantage of the Multipurpose Leaf Crop Harvesting Apparatus and Processing Method is to provide a method for fractionating plants into their leaf and stem parts to increase yield, quality and marketability.

Another advantage of the Multipurpose Leaf Crop Harvesting Apparatus and Processing Method is to strip the leaf from the standing plant and size and, macerate the leaf in preparation for processing the leaf into its final product.

Another advantage of the Multipurpose Leaf Crop Harvesting Apparatus and Processing Method is to eliminate the weather risk of rain, hail, wind, humidity and sun bleach to the leaf fraction by doing the harvesting in a single pass operation.

Another advantage of the Multipurpose Leaf Crop Harvesting Apparatus and Processing Method is to reduce mechanical harvest leaf losses from conventional harvesting methods.

Another advantage of the Multipurpose Leaf Crop Harvesting Apparatus and Processing Method is to utilize the nutritionally consistent high-quality plant leaves for high quality forage feed products to stabilize the diets of animals.

Another advantage of the Multipurpose Leaf Crop Harvesting Apparatus and Processing Method by making one pass over the field is the savings in labor, machine time and fuel costs, and lessens crop field soil compaction.

Another advantage of the Multipurpose Leaf Crop Harvesting Apparatus and Processing Method is to provide a unique single pass harvesting leaf combine to process and remove the high-quality leaves from the field and cut and windrow the stems to be baled for transport to be processed.

These together with other advantages of the Multipurpose Leaf Crop Harvesting Apparatus and Processing Method along with the various features of novelty, which characterize the design, are pointed out with particularity in the claims annexed to and forming a part of this disclosure. In this respect, before explaining at least one of the embodiments of the Multipurpose Leaf Crop Harvesting Apparatus and Processing Method in detail it is to be understood that the design is not limited in its application to the details of construction and to the composition set forth in the following description or illustrated in the drawings. The Multipurpose Leaf Crop Harvesting Apparatus and Processing Method are capable of other embodiments and of being practiced and carried out in various ways. In addition, it is to be understood that the phraseology and terminology employed herein are for the purpose of description and should not be regarded as limiting.

The Multipurpose Leaf Crop Harvesting Apparatus and Processing Method have been developed to harvest the leaf fraction directly from the field and take it expeditiously to a processing facility where the leaf fraction will be densified, for example dry-cured. The removed leaf fraction is transported to the processing facility expeditiously to prevent/stop cellular respiration. Expeditiously can be defined herein as the time necessary to arrest and stop cellular respiration, typically 10 to 90 minutes. The densified leaf fraction can then be processed into a customer-desired forage feed ration product.

The Multipurpose Leaf Crop Harvesting Apparatus and Processing Method strips the leaves of a standing plant such as alfalfa. The leaves are conveyed into a chopper to size the leaf fraction for processing. The leaves are run through a macerator to rupture the cells of the plant leaf to speed up the drying process. The sized, chopped and macerated leaf fraction is then elevated onto a trailer. It is anticipated that the leaf sizing and maceration could take place within the harvester, or alternatively, on site at the processing facility after the leaf fraction is transported to that facility.

The stem fraction of the plant will be cut, conditioned and windrowed after the leaf fraction has been removed. In addition to the leaf fraction being utilized, the stem fraction can also be used and processed into animal rations. Several anticipated ways to utilize the stem fraction include: (1) Double compressing the stem fraction will yield a softer and more palatable product for animals; (2) Chopping the stem fraction will create a loose form which may then be added to pellets and cubes, thereby creating a customized animal ration. Moreover, the stem fraction may be sold directly as bales. The stem fraction may also be used as a biofuel.

The Multipurpose Leaf Crop Harvesting Apparatus and Processing Method, will include a stripper header, chopper, macerator, elevator and railer for the leaf fraction and a cutting head, conditioner and windrower for the stem fraction. This process can be applied to a wide variety of leaf crop plants like legumes such as Alfalfa, Clover, Sainfoin, Birdsfoot Trefoil and Austrian Winter Peas, as well as grasses and green (not ripe) plant seed head removal of grasses, such as Timothy, Orchard, Bermuda, Brome, Bluegrass Oat and Barley, Wheat, and Triticale, and many other leaf stem plants or other green grass seed head plants.

Production Requirements
1) Forage power units with combination alfalfa plant fractionation, maceration, stem cutting, conditioning, and windrowing headers capable of harvesting the required acreage per day to meet dryer needs.
2) Trucks with beds to haul the leaf fraction material from field to drying facility
3) Rakes and tractors to rake stems for baling
4) Big square balers and tractors to bale stem fraction
5) Bale retrieving trucks to haul bale stems to edge of field for loading
6) Loaders and trucks to haul haled stems to process facility
7) Real estate for processing plant
8) Dryer
9) Processing equipment
10) Packaging equipment.
11) Storage facilities for both leaf and stem fraction products
12) Vehicles, tools, spare pans, etc.

The leaf fraction will be fractionated, sized, and elevated for transportation in one, pass. The stem fraction will be cut in a separate pass using a conventional hay swather. The macerator will be located at the production facility prior to drying. However, we are working to build a machine that will incorporate the steps of fractionation, maceration, sizing, elevating, and cutting the stem fraction all in one pass. This process improves nutritional values, eliminates harvest weather risks and prevents losses in quality to the leaf fraction from bleaching, prolonged plant respiration, dirt, mold and decay. The quick drying of the leaf fraction improves carbohydrate retention by stopping plant respiration much faster than is possible in the conventional baying process. The consistency of the leaf fraction will make it possible to formulate consistent high-quality rations for the varying feed requirements in an animal's life cycle.

Livestock and pets have optional nutritionally balanced diets based on the stage of life and production utility. The fractionation of the plants will allow animal nutritionists to better optimize feeding rations for animal health and performance. This will also allow producers to better balance the feed rations of the animals. The leaf fraction provided can be mixed with any available fiber, feed and supplement to create the ideal consistent ration for optimal production and health. This invention allows for higher yields per acre, higher quality per ton produced, eliminates weather risk to the high value leaf fraction and nutritional consistency to the end user.

The conventional method for the producing dried alfalfa has not changed since the 1950's. Alfalfa is cured, conditioned, windrowed, raked, baled and stacked. The sizes of both the machinery and the bales have gotten bigger and faster over time but the basic process has remained the same. Conventional haying faces the following problems; mechanical yield loss at each step of the process, yield and quality losses due to the harvest weather risks of rain, hail, humidity, wind, too much dew, not enough dew and sun bleach along with the inconsistency of product due to the maturation and ever-changing feed quality of the stem fraction. Using the Multipurpose Leaf Crop Harvesting Apparatus and Processing Method, the leaf fraction of the plant can be harvested for optimal leaf yield. The conventional methods for producing quality alfalfa are responsible for losing 10% to 40% of the high-quality leaf yield potential due to harvest intervals, poor weather, and mechanical losses. The present Multipurpose Leaf Crop Harvesting Apparatus and Processing Method, for alfalfa leaf hay process, for example, eliminates all but 3 to 5% of leaf loss, and eliminates harvest weather risks to the leaf fraction.

Leaves are leaves in alfalfa; however, alfalfa forage quality changes daily through the maturation of the stem fraction of the plant Leaves harvested in the vegetative state through 40% bloom have the highest nutritional value. This harvesting and curing process gives customers nutritionally consistent, highly palatable products tailored to animal feeding requirements. Separate leaves in a process that strips the leaves from the stems macerates the leaves, sizes the leaf fraction for drying and elevates the leaves onto a truck. The sterns are cut, conditioned, and windrowed in the same pass. This leaf combine completes seven steps in one pass, eliminating weather associated harvest risks to the high value leaf fraction, and increases leaf yield by 15% to 30% over conventional methods. However, timing for maximum leaf expression will increase yields, extend stand life and result in fewer harvests per year.

The leaf fraction of the alfalfa will be transported by truck to a processing facility for densification, drying, curing and a wide variety of other further processing operations. The leaf fraction will be dried as soon as possible to stop respiration for maximum nutritional value. The stem fraction of the plant will be conventionally sun cured, raked and baled. The same can be accomplished with green (not ripe) grass seed heads and resulting stripped grass stems.

Alfalfa fractionation brings customizable product consistency to the market. Higher yields (due to mechanical efficiencies and harvest timing) and leaf fraction weather risk abatement allow for more profitability as compared to existing conventional haying methods. The nutritional consistency and superior palatability of these products will be highly sought after in the marketplace and new markets will be opened to alfalfa targeted products. Animal nutritionists will be able to have a more consistent ration for livestock and pets.

Export markets will be more accessible. Dozens of leaf fraction processing facilities will be located in targeted geographical areas across the USA and beyond to change the way alfalfa is harvested and marketed worldwide. The production of alfalfa has not changed in 75 years beyond the size and speed of equipment and bales. Alfalfa fractionalization, technology brings greater yields per acre of the high value leaf fraction, higher quality per ton, decreased weather risks, and accomplishing fractionation and removal in one pass lessens crop field soil compaction. All of this adds up to increased profitability to the forage industry. We have the potential for branding high quality products and carving out a large percentage of the alfalfa industry.

With respect to the above description then, it is to be realized that the optimum dimensional relationships for the parts of this application, to include variations in size, materials, shape, form, function and manner of operation, assembly and use, are deemed readily apparent and obvious to one skilled in the art. All equivalent relationships to those illustrated in the drawings and described in the specification intend to be encompassed by the present disclosure. Therefore, the foregoing is considered as illustrative only of the principles of the Multipurpose Leaf Crop Harvesting Apparatus and Processing Method. Further, since numerous modifications and changes will readily occur to those skilled in the art, it is not desired to limit the design to the exact construction and operation shown and described, and accordingly, all suitable modifications and equivalents may be resorted to, falling within the scope of this application. It should also be realized by those skilled in the art that such equivalent constructions and methods do not depart from the spirit and scope of this application as set forth in the appended claims.

BRIEF DESCRIPTION OF THE DRAWINGS

The accompanying drawings, which are incorporated in the Multipurpose Leaf Crop Harvesting Apparatus and Processing Method and form a part of this specification, illustrate embodiments of the and together with the description, serve to explain the principles of this application.

For a fuller understanding of the nature and advantages of the Multipurpose Leaf Crop Harvesting Apparatus and Processing Method, reference should be had to the following detailed description taken in conjunction with the accompanying drawings which are incorporated in and form a part of this specification, illustrate embodiments of the design and together with the description, serve to explain the principles of this application.

DETAILED DESCRIPTION OF THE PREFERRED EMBODIMENTS

Figure 1:
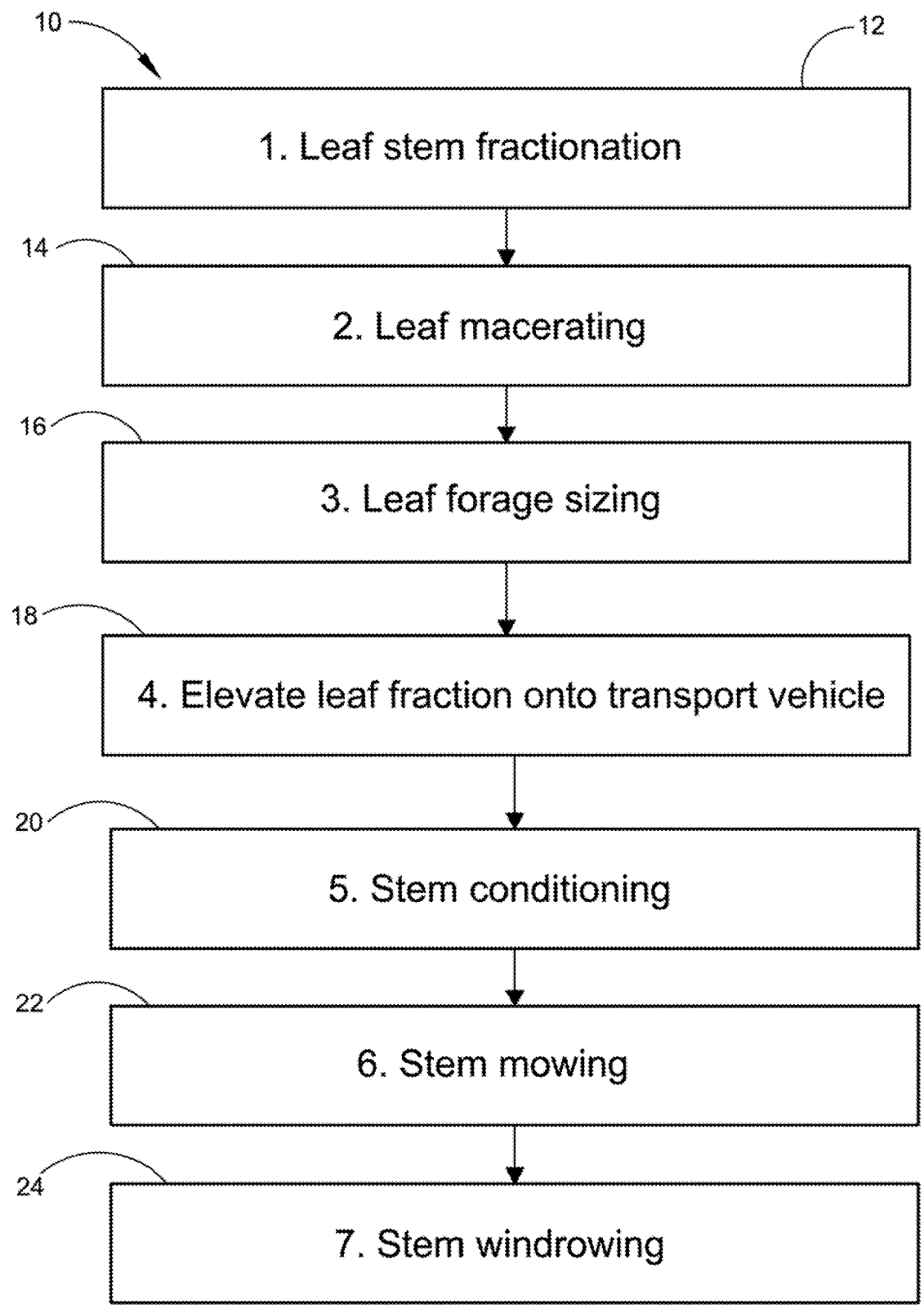
FIG. 1 indicates the seven steps capable of being performed in one pass of the crop field by the Multipurpose Leaf Crop Harvesting Apparatus alfalfa combine harvester.

Referring now to the drawings, wherein similar parts of the Multipurpose Leaf Crop Harvesting Apparatus and Processing Method 10 are identified by like reference numerals, there is seen in FIG. 1 blocks representing the steps of the seven performed functions in the Multipurpose Leaf Crop Harvesting Apparatus and Processing Method 10 indicating the seven steps performed in one pass in the crop field, of the alfalfa combine harvester according to the present invention. This alfalfa combine harvester encompasses a header unit, an adapter unit, a cutter bar, and a forage harvester vehicle.

Referring now to the Multipurpose Leaf Crop Harvesting Apparatus and Processing Method 10 as shown in FIG. 1, Block 12-Step 1 indicates the leaf fractionation step where this process improves nutritional values, eliminates harvest weather risks and prevents losses in quality to the leaf fraction from bleaching, prolonged plant respiration, dirt, mold and decay. The quick drying of the leaf fraction improves carbohydrate retention by stopping plant respiration much faster than is possible in the conventional haying process. The fractionation of the plants will also allow animal nutritionists to better optimize feeding rations for animal health and performance.

Block 14-Step 2 indicates the leaf macerating step where leaves are run through a macerator to rupture the cells of the plant leaf to speed up the drying process.

Block 16-Step 3 indicates leaf forage sizing step where the leaves are conveyed into a chopper to size the leaf fraction for processing. It is anticipated that the leaf sizing and maceration could take place within the harvester, or alternatively, on site at the processing facility after the leaf fraction is transported to that facility.

Block 18-Step 4 indicates where the leaf fraction is elevated into a transport vehicle or trailer and taken by truck to a drying facility for curing and processing, wherein such processing steps are performed expeditiously after harvesting.

Block 20-Step 5 indicates the stem conditioning, the first step in which the leaf crop stems are cut, conditioned, and windrowed in the same pass. This leaf combine completes seven steps in one pass, and because it removes the leaf fraction from the field expeditiously after being harvested, this harvesting process eliminates weather associated harvest risks to the high value leaf fraction.

Block 22-Step 6 indicates the stem mowing step where the stems are mowed and cut.

Block 24-Step 7 indicates the stem fraction step where the plant will be windrowed or may be conventionally sun cured, raked and baled. The stem conditioning, cutting and windrowing operations can be accomplished in the same pass. This leaf crop harvesting combine completes each of these seven steps in one pass, thereby eliminating weather associated harvest risks to the high value leaf fraction. The valuable leaf fraction is expeditiously removed from the field to be further processed, while the less valuable stem fraction remains in the field and can be expeditiously baled or removed contemporaneously.

Therefore, it should be understood that the multipurpose leaf crop harvesting apparatus is configured to be capable of performing one or more the following seven operations in one pass through a crop field:
  a) leaf stem fractionation;
  b) leaf maceration;
  c) leaf forage sizing;
  d) elevation of leaf fractions onto a transport vehicle;
  e) stem conditioning;
  f) stern mowing/cutting; and
  g) stem windrowing;
wherein said multipurpose leaf crop harvesting apparatus enables the direct and expeditious removal of the leaf crop leaf fraction from the Cr op field upon harvest of the leaf crop simultaneously with the seven operations performed.

Figure 2:
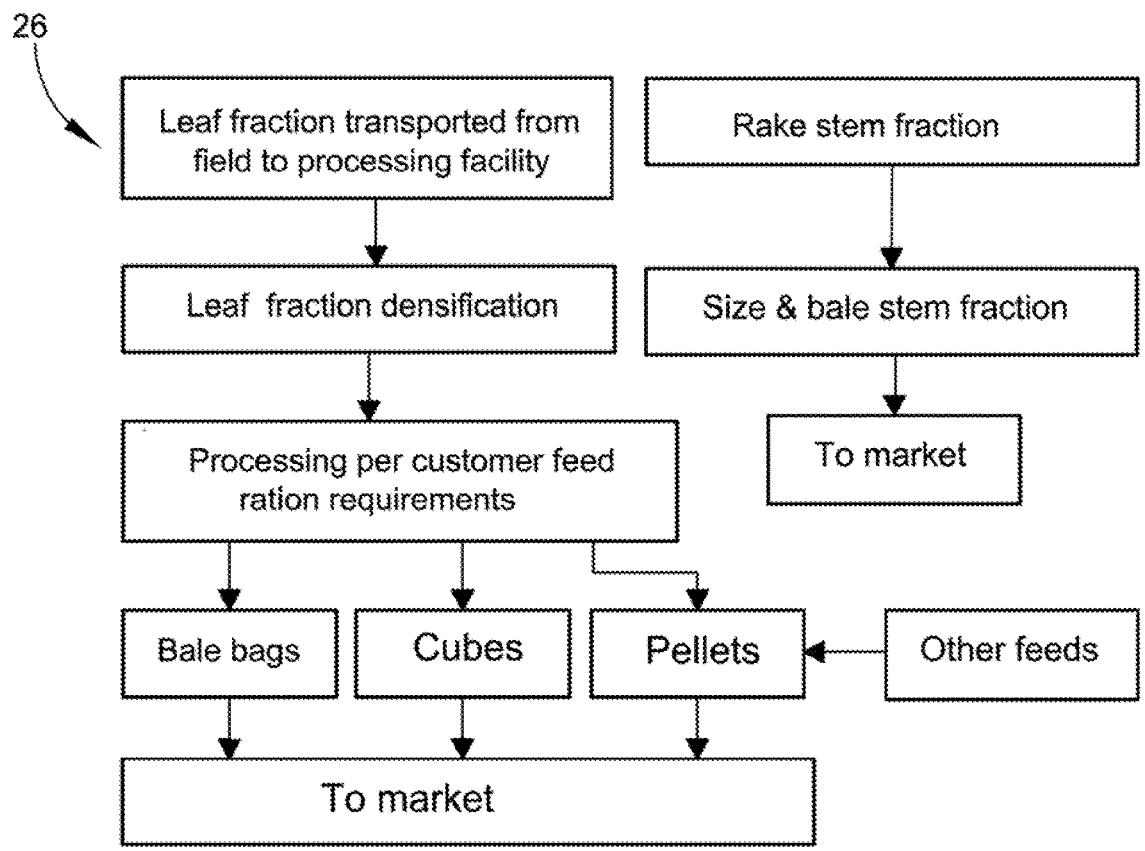
FIG. 2 describes the processing steps taken expeditiously after harvesting where leaf fraction is trucked from the field to the processing plant and formed into bales, cubes and pellets before delivery to market, and the stem fraction is processed for varying uses.

FIG. 2 is a block diagram 26 that describes the processing where leaf fraction is trucked from the field to the processing plant where the leaf fraction drying is accomplished. Processing of the valuable leaf fraction can be done per customized customer feed ration requirements. Once this customized formulating and mixing is accomplished, the forage feed products are put in bales, bags, cubes or formed into pellets, bagged and sent to market as a high-quality forage feed product.

Therefore, it should be understood from FIG. 2, that the method of harvesting and processing a harvested leaf crop comprises the steps of:

First, providing a multipurpose leaf crop harvesting apparatus which is configured to be capable of performing one or more of the following seven operations in one pass through a crop field: 1) leaf stem fractionation; 2) leaf maceration; 3) leaf forage sizing; 4) elevation of leaf fraction onto a transport vehicle; 5) stem conditioning; 6) stem mowing/cutting; and 7) stem windrowing; wherein said multipurpose leaf crop harvesting apparatus enables the direct and expeditious removal of the leaf crop leaf fraction from the crop field upon harvest of the leaf crop simultaneously with the seven operations performed.

Second, transporting the leaf fraction to a processing plant where the leaf fraction is expeditiously densified which normally includes drying; and formulated into feed rations per customer feed ration requirements. Other forms of leaf fraction densification are also anticipated.

Third, forming the resulting feed rations into hales, bale bags, cubes and pellets for distribution and marketing of the feed rations generated, wherein the processing steps are taken expeditiously after harvesting the leaf crop to generate the formulated forage feed rations per customer feed ration requirements. In this way, a leaf crop forage feed ration product is generated employing the method of harvesting and processing a harvested leaf crop comprising the above enumerated steps, wherein the forage feed ration is subsequently processed into custom feed ration products by the addition of feed additives as per customer requirements.

The stem fraction of the plant will be conditioned (broken and damaged to expose inner moisture and expedite drying), cut and windrowed after the leaf fraction has been removed. In addition to the leaf fraction being densified then utilized, the stem fraction can also be densified, then utilized by further processing into animal rations. Several anticipated ways to utilize the stem fraction include (1) double compressing the stem fraction will yield a softer and more palatable product for animals; (2) chopping the stem fraction will create a loose form which may then be added to pellets and cubes, thereby creating a customized animal ration. In this way, a leaf crop stem fraction forage feed ration product is generated employing the method of harvesting and processing a harvested leaf crop comprising the above steps, wherein the stem forage feed ration is processed into custom feed ration products by the addition of feed additives as per customer requirements. Moreover, the stem fraction may be sold directly as bales, or further processed into any of many varying forms to be used as a feed ration or to be mixed into feed ration formulations. Additionally, the stem fraction may also be densified and used as a biofuel.

Figure 3:
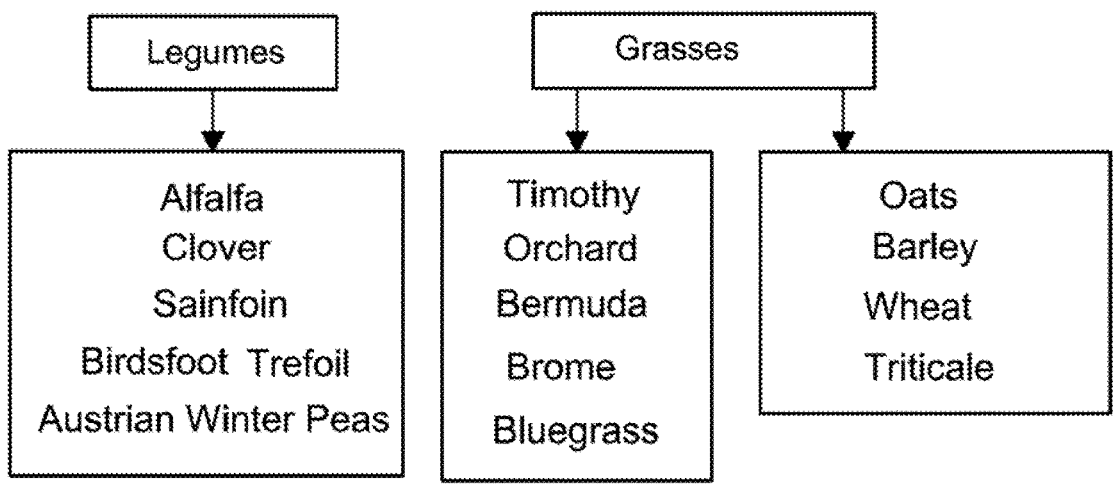
FIG. 3 describes a classification of bay broken down into legumes and grasses which potentially form the available harvested forage feed products according to the present invention.

FIG. 3 is a block diagram 28 that describes the products available from the Multipurpose Leaf Crop Harvesting Apparatus and Processing Method such as Legumes for Alfalfa, Clover, Sainfoin, Birdsfoot Trefoil and Austrian Winter Peas. Grasses can be; Timothy, Orchard, Bermuda, Brome and Bluegrass. Additional grasses can be Oats and Barley, Wheat, and Triticale. On grasses, it is anticipated that the nutrient rich green seed heads would be stripped from the stern and harvested. In this regard, the Multipurpose Leaf Crop Harvesting Apparatus and Processing Method 10 readily enables the stripping of green seed heads from grasses, such as for example Timothy grass. Green seed heads from Timothy grass and other grasses have become an important source for small animal rations and can be customized for each individual customer's feed requirement needs. After the green (not ripened) seed heads are removed from the plant, the remaining headless grasses will be cut, conditioned and windrowed for sun curing and baling, much in the same way as the alfalfa stems are processed.

Figure 4:
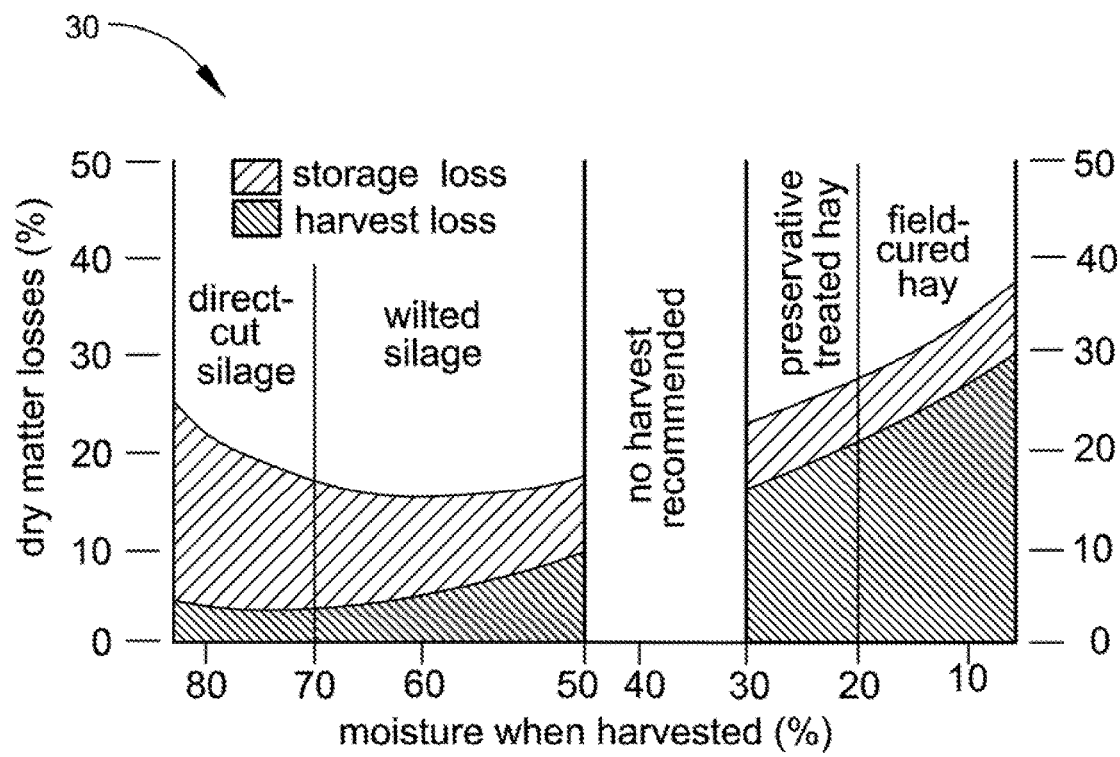
FIG. 4 depicts where dry matter losses during harvest and storage are relative the end product moisture content.

FIG. 4 is a chart 30 indicating where dry matter losses during harvest and storage are relative to the end product moisture content. This chart 30 demonstrates the importance of expeditious removal of the leaf fraction of a leaf crop to preserve the higher nutritional value of the resulting feed product Additionally, as the hay lays in the field drying, it is vulnerable to extreme loss due to weather events beyond the control of the firmer. It is also important to prevent or stop cellular respiration in the harvested plant to preserve nutritional value. The Multipurpose Leaf Crop Harvesting Apparatus and Processing Method have been developed to harvest the leaf fraction directly from the field and take it expeditiously to a processing facility where the leaf fraction will be densified, for example dry-cured. The removed leaf fraction is transported to the processing facility expeditiously to prevent/stop cellular respiration. Expeditiously can be defined herein as the time necessary to arrest and stop cellular respiration, typically 10 to 90 minutes. The densified leaf fraction can then be processed into a customer-desired forage feed ration, product.

Figure 5:
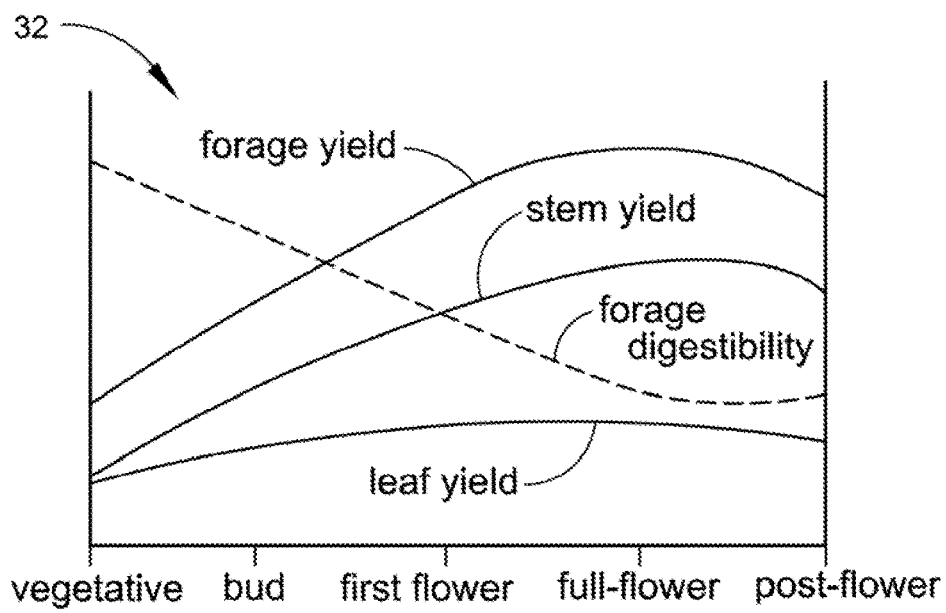
FIG. 5 depicts a chart indicating the forage yield relative to quality at different stages of growth of the leaf crop.
Figure 6:
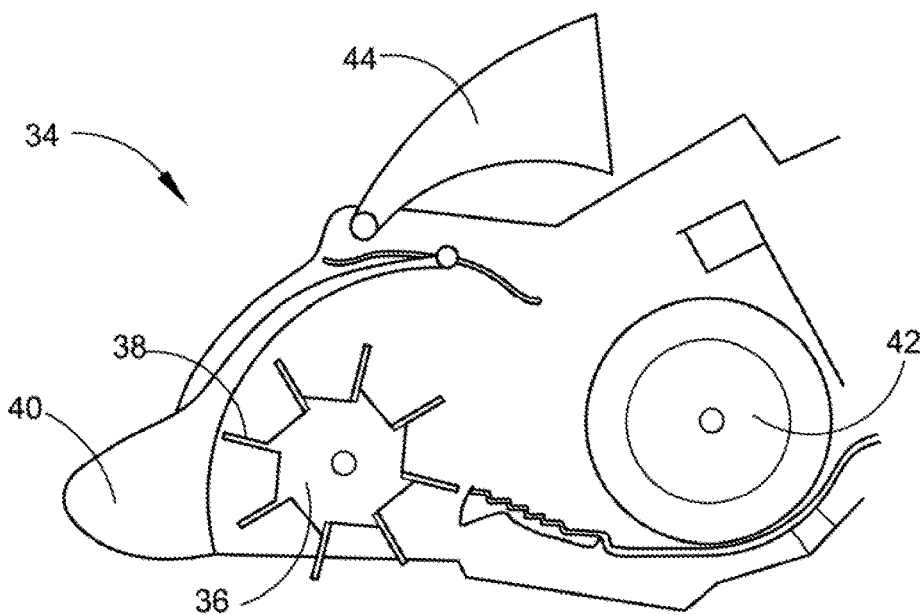
FIG. 6 depicts a side elevation cross-sectional view of the multipurpose harvesting apparatus header unit and the inner pans housed therein involved in the crop harvesting process.

FIG. 5 is a chart 32 indicating the forage yield relative to the quality of the end product at different stages where the vegetative, bud, first flower and post flower are shown. Clearly, the forage yield is at its highest in the late maturity state, whereas, forage digestibility in animals decreases toward the full flower stage, where leaf yield peaks, FIG. 6 depicts a side elevation drawing of a multipurpose harvesting apparatus header unit 34 illustrating that the header unit 34 houses the stripper rotor 36. The stripper rotor has a plurality of rows of stripper fingers 38 (here seven rows are shown), The header unit 34 also houses the stripper rotor 36 with rows of stripper fingers 38. The header unit 34 has a height adjustable crop deflector 40, and an auger 42, and a top hood 44. The auger 42 is a screw type auger that conveys the stripped leaves (leaf fraction material) through the center of the header unit 34. The rotation of the stripper rotor 36 during forward motion of the header unit 34 results in the leaves of the crop being stripped from the stems through the action of the stripper fingers 38.

Figure 7:
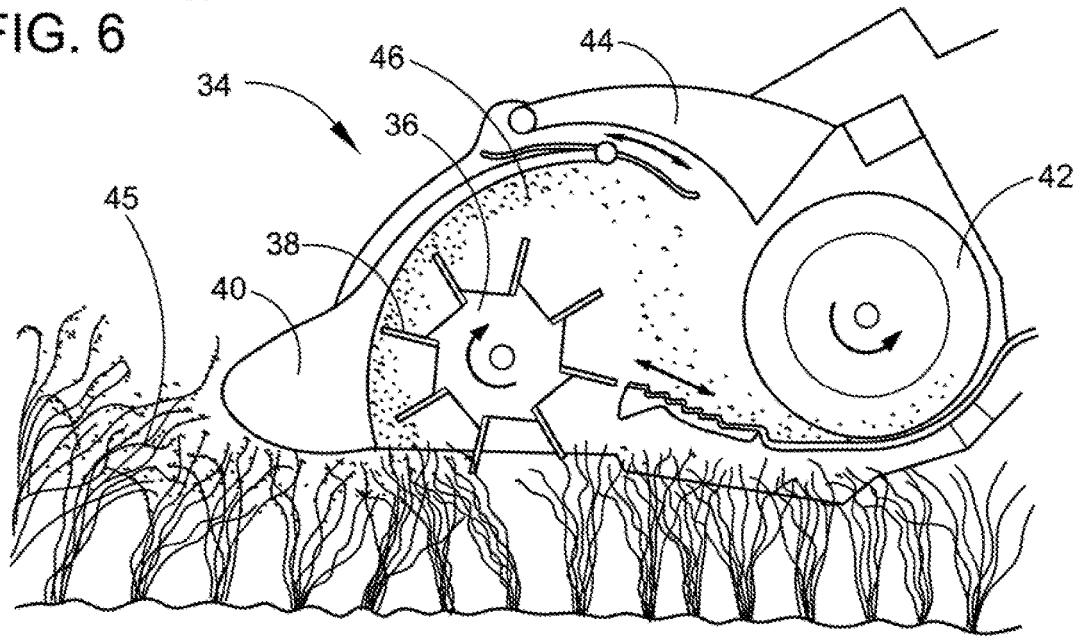
FIG. 7 depicts a side elevation cross-sectional view of the multipurpose harvesting apparatus header unit illustrating the harvesting of an alfalfa type of leaf crop in the field in one pass, to eventually make up the leaf crop forage feed end product.

FIG. 7 depicts a side elevation drawing of multipurpose harvesting apparatus header unit 34 illustrating the harvesting of an uncut whole plant alfalfa leaf crop 45 into a leaf fraction 46. As shown here, the leaf fraction 46 is removed from the stems leaving, the stems standing in the crop field. The leaf fraction is then moved up through the header unit 34 through the action of the stripper rotor 36 which rotates, and the stripper fingers 38 mounted on the stripper rotor 36 which strip the leaf crop leaves from the stems. The height adjustable crop deflector 40 acts to position the leaf crop for optimal stripping of the leaves from the stems, depending on the leaf crop (or grass crop) to be harvested and removed from the crop field. The resulting leaf fraction moves to the auger 42 and is transported on an elevating chute and discharge spout apparatus to be loaded onto the transport vehicles comprising trucks or trailers, for transport to the processing facilities.

Figure 8:
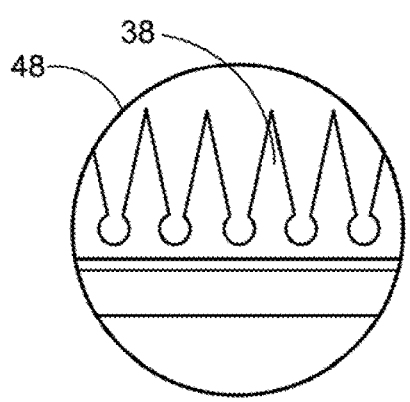
FIG. 8 depicts one type of the stripper fingers used on the combine harvesting equipment.

FIG. 8 depicts a detail illustration 48 of one type of stripper fingers 38 located on the stripper rotor 36. Three different types of stripper fingers are anticipated for use, the Shelbourne fingers (as shown in the figures here), hay tine type fingers, and sweeper brushes, all of which are anticipated to be used in the harvesting of varying leaf and hay crops, according to the present invention.

Figure 9:
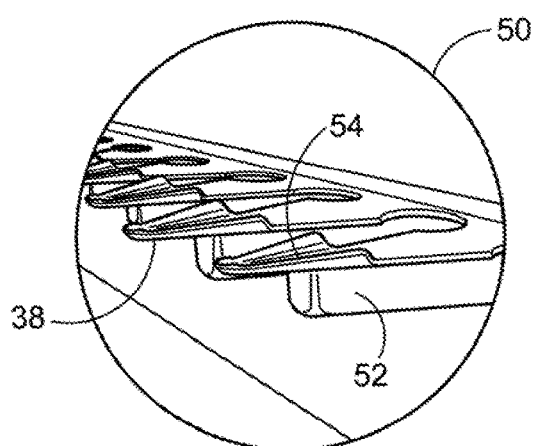
FIG. 9 depicts a perspective side view of an alternate type of stripper fingers illustrating a support member and contoured stripper fingers ends to aide in the stripping process.

FIG. 9 depicts an illustration 50 of a type of stripper fingers 38 anticipated for use haying a structure including a support member 52 and a contoured stripper finger end 54 to aide in the stripping process. This shown stripper finger 38 configuration is the preferred stripper finger configuration, but as mentioned above, other stripper finger configurations could also be used for varying leaf crop, grass crop and hay crop harvesting, using the multipurpose harvesting apparatus header unit 34.

Figure 10:
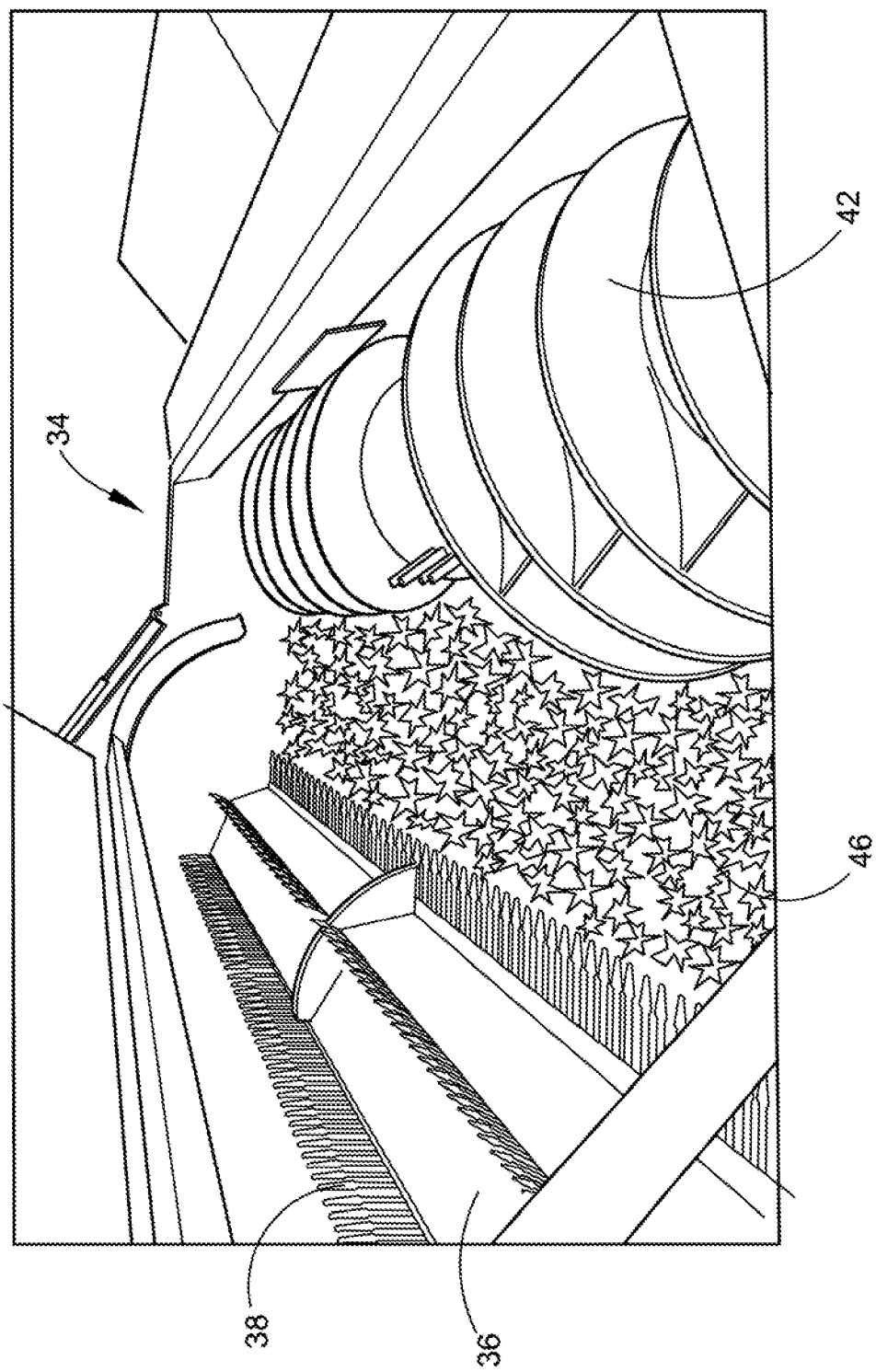
FIG. 10 depicts a perspective side view of the central inner portion of the multipurpose harvesting apparatus header unit illustrating the movement of the parts and the movement of the leaf crop harvested through the header unit.

FIG. 10 depicts an illustration of the inside of the central portion of the multipurpose harvesting apparatus header unit 34 showing the stripper rotor 36, alfalfa leaf fraction (stripped off crop leaves) of the now cut whole plant alfalfa leaf crop 45 and the auger 42. This illustrates the movement of the stripped leaf fraction 46 into the auger 42 after being cut and moved through the rotation of the stripper rotor 36 having a plurality of stripper lingers 38 thereon. The rotation speed of the stripper rotor can vary in RPM depending on the type of crop to be harvested. It is anticipated that the leaf fraction 46 may then move to a leaf macerator for leaf fraction maceration, or alternatively, the maceration step may occur at a processing facility after the harvested leaf fraction is elevated onto transport vehicles during the harvesting pass, and directly and expeditiously transported to that processing facility. Additionally, leaf sizing may occur within the process in addition to or separate from the leaf maceration operation.

Figure 11:
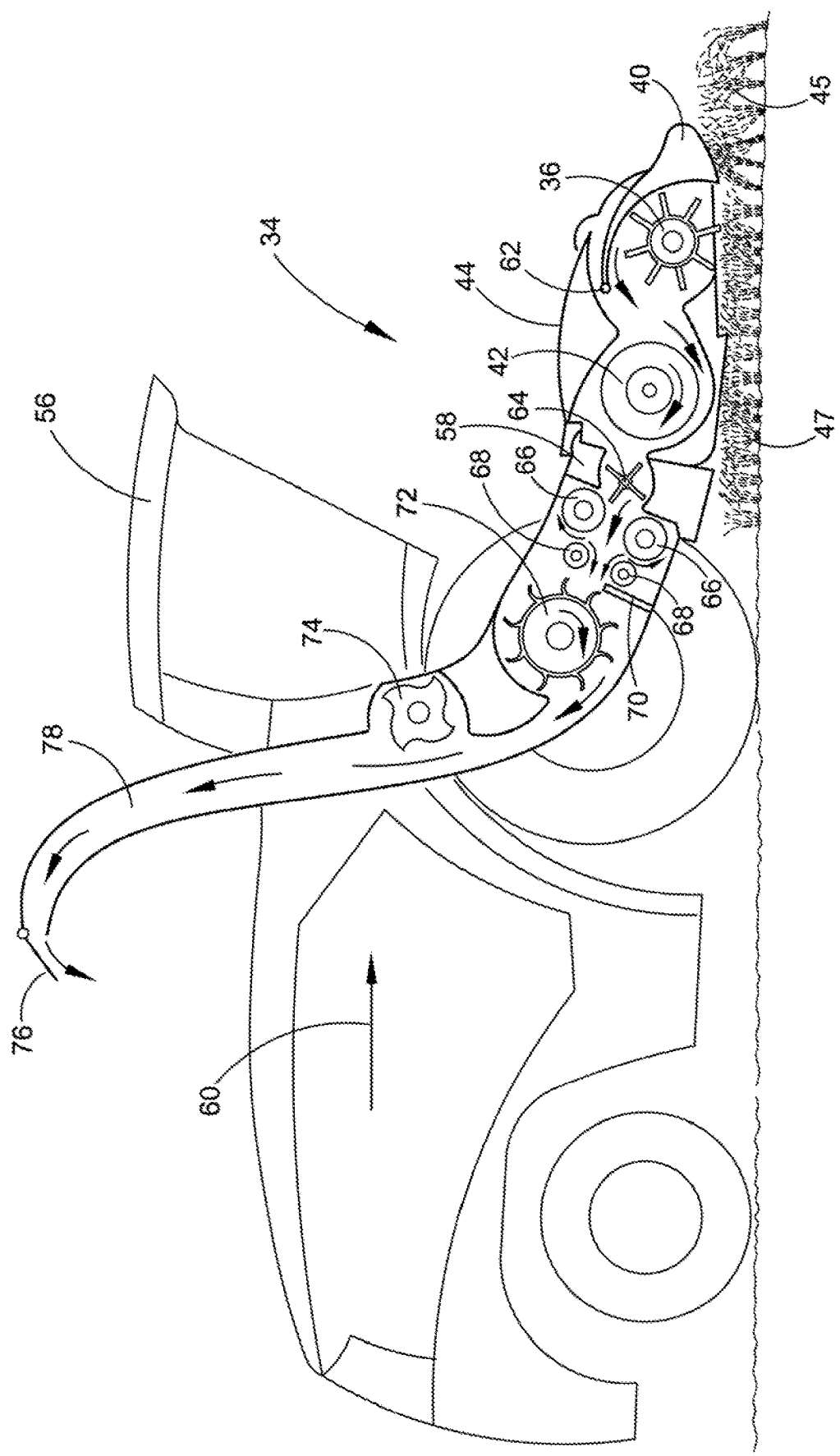
FIG. 11 depicts a side elevation cutaway view of the multipurpose harvesting apparatus header unit attached to a forage harvester vehicle having an adapter therebetween, and illustrating the moving parts involved with the leaf fractionation process carried out by the harvesting apparatus header unit.
Figure 12:
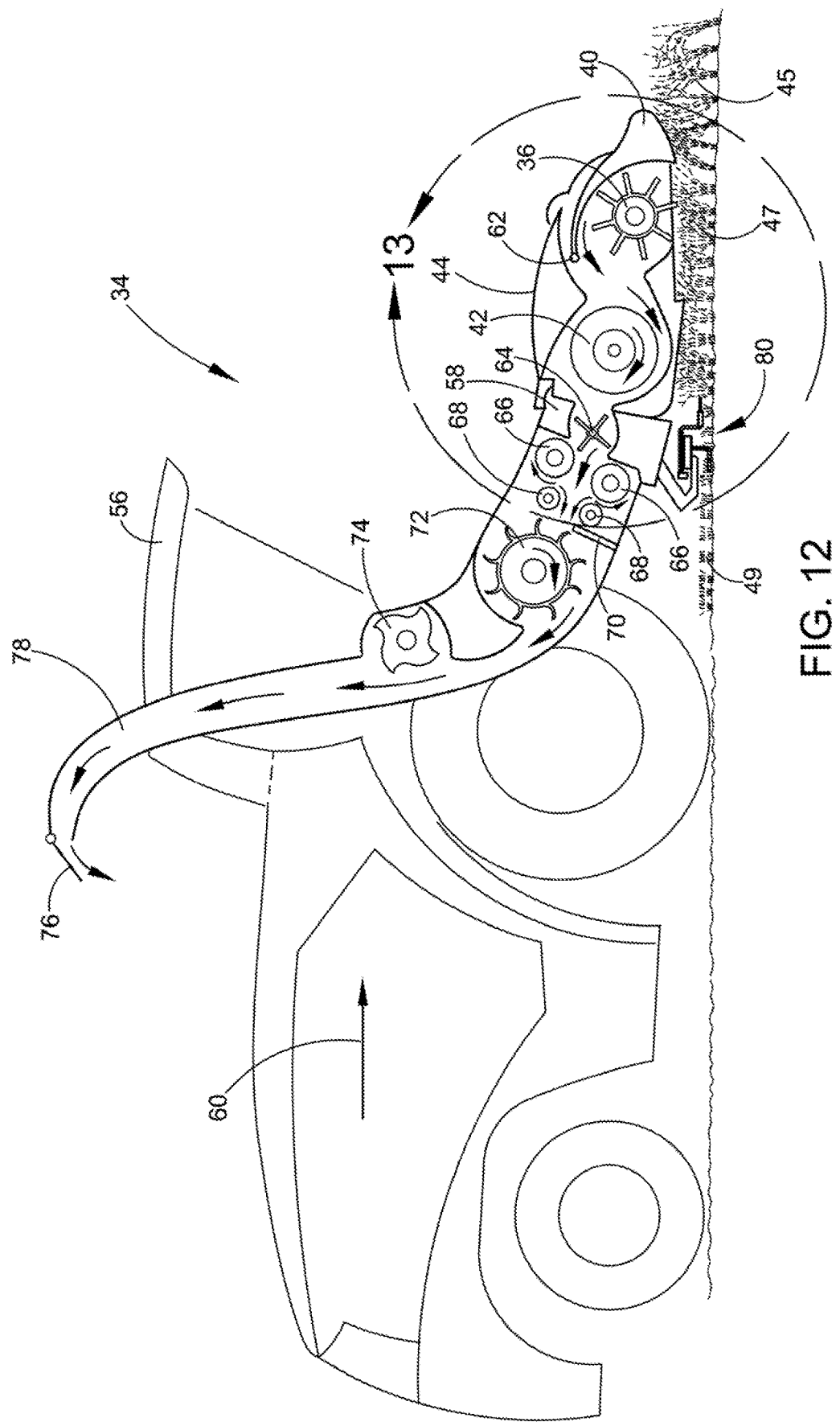
FIG. 12 depicts a side elevation cut-away view of the multipurpose harvesting apparatus header unit attached to a forage harvester vehicle having an adapter therebetween, and illustrating the stem cutting bar mounted on the underside of the multipurpose harvesting apparatus header unit.

FIG. 11 depicts a side elevation cut-away view of the multipurpose harvesting apparatus header unit 34 attached to a forage harvester vehicle 56 having an adapter feeder macerator assembly 58 therebetween, and illustrating the moving parts involved with the leaf fractionation process carried out by the harvesting apparatus header unit 34 and the subsequent movement of the resulting leaf fraction. In order to optimize leaf fractionation, the height adjustable crop deflector 40 is mounted on the front of the header unit 34 and can be positioned upwardly or downwardly riding on a crop deflector guide roller 62 located under the top hood 44 of header unit 34. When the combine harvester moves forward 60, and stripper rotor 36 is rotating, the leaves of the now cut whole plant alfalfa leaf crop 45 are stripped from the stems of the crop, leaving only stripped leaf crop stems 47 and moved into an auger 42. The auger 42 then moves the leaf fraction into the adapter feeder macerator assembly 58 to an adapter feeder paddlewheel 64, through multiple primary feed rolls 66, multiple secondary feed rolls and past a shear bar 70 to a rotating cutter drum 72. From there, the leaf fraction is elevated by the action of the rotating cutter drum 72 and a blower accelerator 74 up through and out of a discharged spout 78 in a specified direction dictated by a directional discharge plate 76 located on the end of the discharged spout 78, FIG. 12 depicts a side elevation cut-away view of the multipurpose harvesting apparatus header unit 34 attached to a forage harvester vehicle 56 having an adapter feeder macerator assembly 58 therebetween, and illustrating the stem cutting bar assembly 80 mounted on the backside of the multipurpose harvesting apparatus header unit 34.

Figure 13:
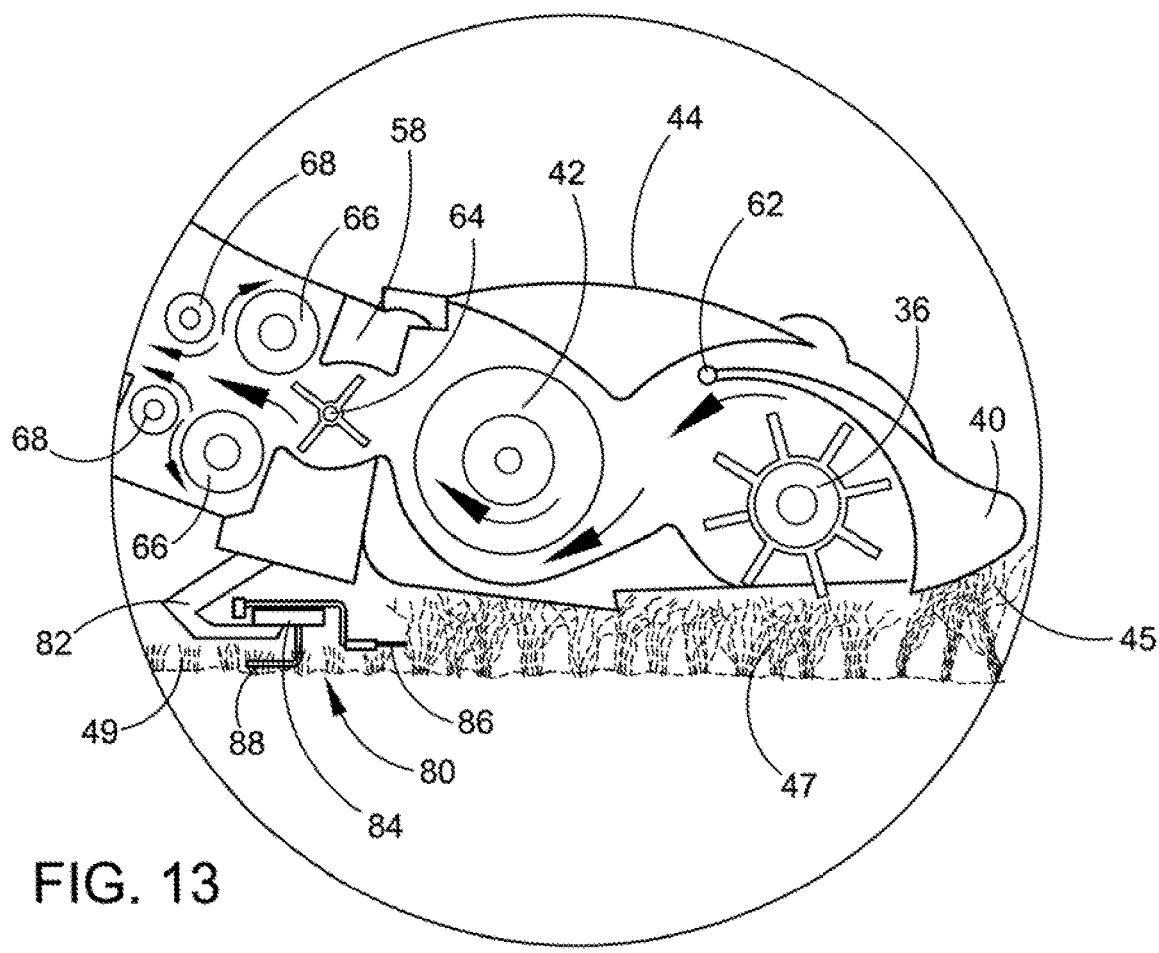
FIG. 13 depicts an enlarged side elevation cut-away view of the multipurpose harvesting apparatus header unit having a stem cutter bar mounted thereto.

FIG. 13 depicts an enlarged side elevation cut-away view of the multipurpose harvesting apparatus header unit 34 having a stem cutter bar assembly 80 mounted thereto. This enlarged detailed look at the cutter bar assembly 80, illustrates that the cutter bar assembly 80 includes a cutter bar mount arm and machine attach structure 82, a double knife Scissors support bar 84, and a plurality of double knife sections 86 in variable linear lengths depending on the header width, mounted on the cutter double knife support bar 84. When the cutter bar passes over the ground it floats above the ground on the height adjustable skid shoe 88 as it cuts the remaining leaf crop stems 47 down low to the ground leaving a stem stubble 49. This remaining stem stubble 49 allows the plant to regrow in the crop field for future harvesting.

Figure 14:
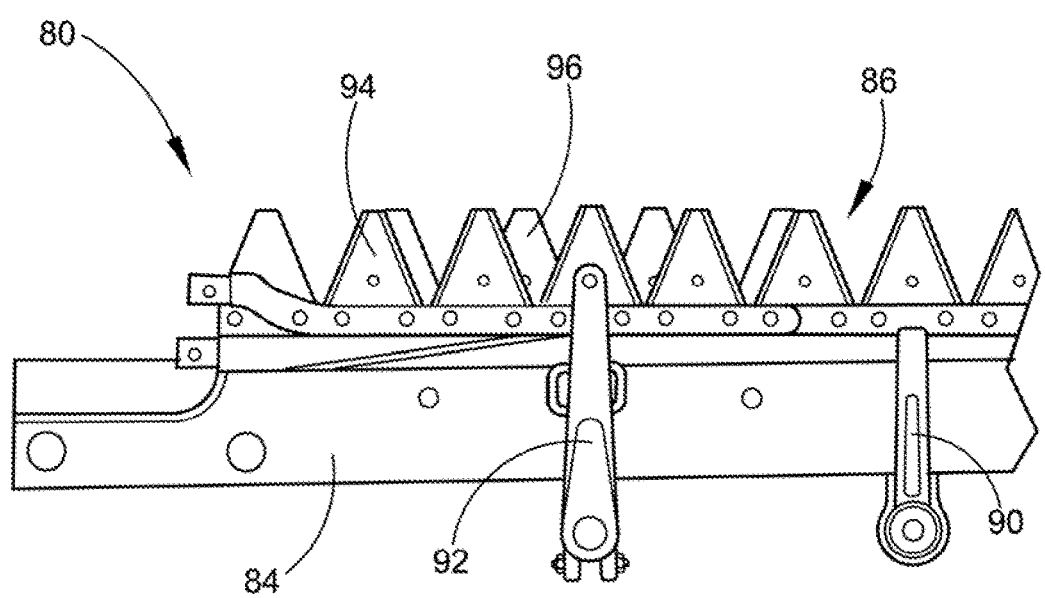
FIG. 14 depicts a partial top plan view of the stem cutter bar illustrating the cutter blades, cutter blade mounting support bars and the cutter blade guide rods and movement actuator rods.

FIG. 14 depicts a partial top plan view of further detail of the stem cutter bar assembly 80 illustrating a closer view of the cutter bar and the reciprocating double knife assembly 82, a double knife support bar 84, and a plurality of upper double knife blades 94, a plurality of lower double knife blades 96, and illustrates the position, orientation and structure of the cutter bar lower knife guide arm 90 and the cutter bar upper knife guide arm 92, with relation to the double knife support bar 84. The action of the stem cutter bar assembly 80 is to cut the stem fraction remaining after the leaf fractionation operation. Stem conditioning, which occurs when the stripper rotor removes the leaf fraction from the plant, involves breaking or damaging the outside surface of the stem, thereby exposing moisture stored in the stem, to allow for faster drying of the stem fraction. Stem windrowing occurs as a natural consequence of stem cutting, as stem windrows are naturally formed during the stem cutting process as performed by the stem cutter bar assembly 80 and the reciprocal double knife assembly 82. In this way, the cut stems windrow formed is optimally spread out beneath the stem cutter bar assembly 80, in between the harvester vehicle tires, to enable quicker and more uniform drying, and rapid drying of the stems preserves more nutrients in the stem fraction.

The Multipurpose Leaf Crop Harvesting Apparatus and Processing Method 10 shown in the drawings and described in detail herein disclose arrangements of elements of particular construction and configuration for illustrating preferred embodiments of structure and method of operation of the present application. It is to be understood, however, that elements of different construction and configuration and other arrangements thereof, other than those illustrated and described may be employed for providing a Multipurpose Leaf Crop Harvesting Apparatus and Processing Method 10 in accordance with the spirit of this disclosure, and such changes, alternations and modifications as would occur to those skilled in the art are considered to be within the scope of this design as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

We claim:

1. A method for harvesting a leaf crop and processing a harvested leaf crop comprising the steps of:
    a) harvesting a leaf crop field having leaf crop leaves and leaf crop stems therein by stripping said leaf crop leaves from said leaf crop stems generating a leaf crop leaf fraction, macerating said leaf crop leaf fraction, sizing said leaf crop leaf fraction and elevating said leaf crop leaf fraction onto a transport vehicle using a multipurpose leaf crop harvesting apparatus wherein said multipurpose leaf crop harvesting apparatus enables said stripping operation, said macerating operation, said sizing operation and the removal of the stripped, macerated and sized leaf crop leaf fraction from the crop field upon harvest of the leaf crop and further wherein all stripping, macerating and sizing operations are performed in one pass through said leaf crop field; and
    b) immediately transporting only said leaf crop leaf fraction elevated onto a transport vehicle directly to a processing plant; and
    c) immediately densifying only said leaf crop leaf fraction into a dried hay upon arrival at said processing plant, thereby generating a densified leaf crop leaf fraction for further processing;
    wherein the transporting and densifying processing steps are taken expeditiously after said one pass through said leaf crop field and removal of said leaf crop leaf fraction.

2. The method of harvesting and processing a harvested leaf crop, according to claim 1, wherein said harvesting method further includes the steps of:
    a) a leaf crop leaf fraction maceration operation, performed during said one pass through said leaf crop field;
    b) a leaf crop leaf fraction sizing operation, performed during said one pass through said leaf crop field; and
    c) a leaf crop stem conditioning and leaf crop stem cutting operation, thereby generating a leaf crop stem fraction, performed during said one pass through said leaf crop field;
    wherein said harvesting apparatus header unit enables said stripping operation, said macerating operation, said sizing operation and said leaf crop stem conditioning and leaf crop stem cutting operation, and the direct and expeditious removal of the leaf crop leaf fraction from the crop field upon harvest of the leaf crop simultaneously with the harvesting operations performed in said one pass through said leaf crop field.

3. The method of harvesting and processing a harvested leaf crop, according to claim 1, wherein said densified leaf crop leaf fraction is further processed by formation of the harvested densified leaf crop leaf fraction into a plurality of feed ration products in the form of bales, bale bags, cubes and pellets.

4. The method of harvesting and processing a harvested leaf crop, according to claim 3, wherein said plurality of feed ration products is further processed into bales, bale bags, cubes and pellets per customer specified feed ration requirements and feed ration specifications.

5. The method of harvesting and processing a harvested leaf crop, according to claim 4, further wherein said plurality of feed ration products is further processed into custom feed ration products by the addition of feed additives as per customer specified feed ration requirements and feed ration specifications.

6. The method of harvesting and processing a harvested leaf crop, according to claim 2, further wherein the leaf crop stem fraction remaining in the leaf crop field following leaf crop leaf fractionation and leaf fraction removal, having been conditioned, is separately removed from the crop field and subsequently separately processed.

7. The method of harvesting and processing a harvested leaf crop, according to claim 6, wherein said separately removed stem fraction is further processed into feed rations, in the form of compressed and chopped feed ration additives and bales.

8. The method of harvesting and processing a harvested leaf crop, according to claim 1, wherein the crop harvested is alfalfa.

9. The method of harvesting and processing a harvested leaf crop, according to claim 1, wherein the crop harvested is a grass crop and said harvesting step further comprises stripping the grass seed head from the grass stem, thereby generating a grass seed head fraction for further processing.

* * * * *